US009959111B2

(12) United States Patent
Plate et al.

(10) Patent No.: US 9,959,111 B2
(45) Date of Patent: May 1, 2018

(54) PRIORITIZATION OF SOFTWARE PATCHES (71) Applicant: SAP SE, Walldorf (DE)

(72) Inventors: Henrik Plate, Valbonne (FR); Serena Ponta, Antibes (FR); Antonino Sabetta, Mouans Sartoux (FR)

(73) Assignee: SAP SE, Walldorf (DE)

(*) Notice: Subject to any disclaimer, the term of this patent is extended or adjusted under 35 U.S.C. 154(b) by 11 days.

(21) Appl. No.: 15/206,323

(22) Filed: Jul. 11, 2016

(65) Prior Publication Data
US 2018/0011700 A1 Jan. 11, 2018

(51) Int. Cl.
G06F 9/445 (2018.01)
(52) U.S. Cl.
CPC .................................... G06F 8/65 (2013.01)
(58) Field of Classification Search
CPC ......................................................... G06F 8/65
USPC ......................................................... 717/168
See application file for complete search history.

(56) References Cited

U.S. PATENT DOCUMENTS 7,865,888 B1*  1/2011  Qureshi ................. G06N 5/048
                                                   717/168
8,924,935 B1* 12/2014  Chopra .................... G06F 8/71
                                                   717/120
9,442,983 B2*  9/2016  Higginson ......... G06F 17/3053
2009/0100419 A1*  4/2009  Childress ................. G06F 8/65
                                                   717/171
2010/0174691 A1*  7/2010  Caldwell ........... G06F 17/30598
                                                   707/696

OTHER PUBLICATIONS

Daniel Voldal; "A Practical Methodology for Implementing a Patch Management Process"; SANS Institute website (www.sans.org); 2003.*

* cited by examiner

Primary Examiner — Qing Chen
Assistant Examiner — Clint Thatcher (57) ABSTRACT

Various embodiments of systems, computer program products, and methods for prioritizing software patches are described herein. In an aspect, the software patches are retrieved by querying software repositories. Further, code changes associated with the software patches are determined. One or more instances of bug fix patterns are identified in determined code changes. The software patches are classified based on the identified bug fix patterns. Priorities of the software patches corresponding to the identified instances of the bug fix patterns are determined based on the classification and a pre-defined policy. Upon determining priorities, the software patches are installed based on the priorities.

14 Claims, 5 Drawing Sheets

```
                                   ┌─────────────────────────────────────────────────────────────────────────────────────┐
┌─310    ┌─320    ┌─330             │                                                                                     │
155      157       │      private String getTable(Item item) {                                                             │
156      158       -            Statement statement = null;                                                                │
                   +            PreparedStatement statement = null;                                                        │
157      159              String sqlCmd = null;                                                                            │
158      160              int rowId = 0;                                                                                   │
159      161                                                                                                               │
                   @@ - 165, 14 +167, 17 @@ private String getTable(Item item) {                                           │
165      167              if (tableName != null)                                                                           │
166      168                  return tableName;                                                                            │
167      169       +                                                                                                       │
         170       +      logger.debug ("mySQL: no Table found for itemName = {}", itemName, sqlTables.get(itemName));      │
168      171              //Create a new entry in the Items table. This is the translation of                              │
169      172              //Item name to table                                                                              │
170      173              try {                                                                                             │
171      174       -        sqlCmd = new String("INSERT INTO Items (itemName) VALUES ('" + itemName +"')");                │
172                -        statement = connection.createStatement();                                                      │
173                -        statement.executeUpdate(sqlCmd, Statement.RETURN_GENERATED_KEYS);                              │
174                +        sqlCmd = new String("INSERT INTO Items (ItemsName) VALUES (?)");                              │
175      175       +                                                                                                       │
         176       +        statement = connection.prepareStatement(sqlCmd, Statement.RETURN_GENERATED_KEYS);              │
         177       +        statement.setString(1, itemName);                                                              │
         178       +        statement.executeUpdate();                                                                     │
         179                                                                                                                │
                                   └─────────────────────────────────────────────────────────────────────────────────────┘
```

PRIORITIZATION OF SOFTWARE PATCHES

BACKGROUND

A software patch can be a piece of software designed to update a computer program from one software version to the next software version. The software patch may add a new feature or fix bugs such as security vulnerabilities. Further, vulnerability databases may provide a platform to collect, maintain, and disseminate information about discovered software vulnerabilities in different software versions. However, the source code modification (e.g., actual changes as part of the software patches) introduced by the software patches may be sought manually, for example, by looking up scattered information from websites of open-source software providers.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DETAILED DESCRIPTION

Embodiments of techniques to prioritize software patches are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instance, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence may be mainly for convenience and clarity. A particular step may be repeated more than once, may occur before or after other steps (even if those steps are otherwise described in another sequence), and may occur in parallel with other steps. Further, a step may be executed upon executing another step. Such a situation may be specifically pointed out when not clear from the context. A particular step may be omitted.

In this document, various computer-implemented methods, processes and procedures are described. It is to be understood that the various actions (determining, identifying, receiving, storing, retrieving, and so on) may be performed by a hardware device (e.g., computing system), even if the action may be authorized, initiated or triggered by a user, or even if the hardware device is controlled by a computer program, software, firmware, and the like.

Figure 1:
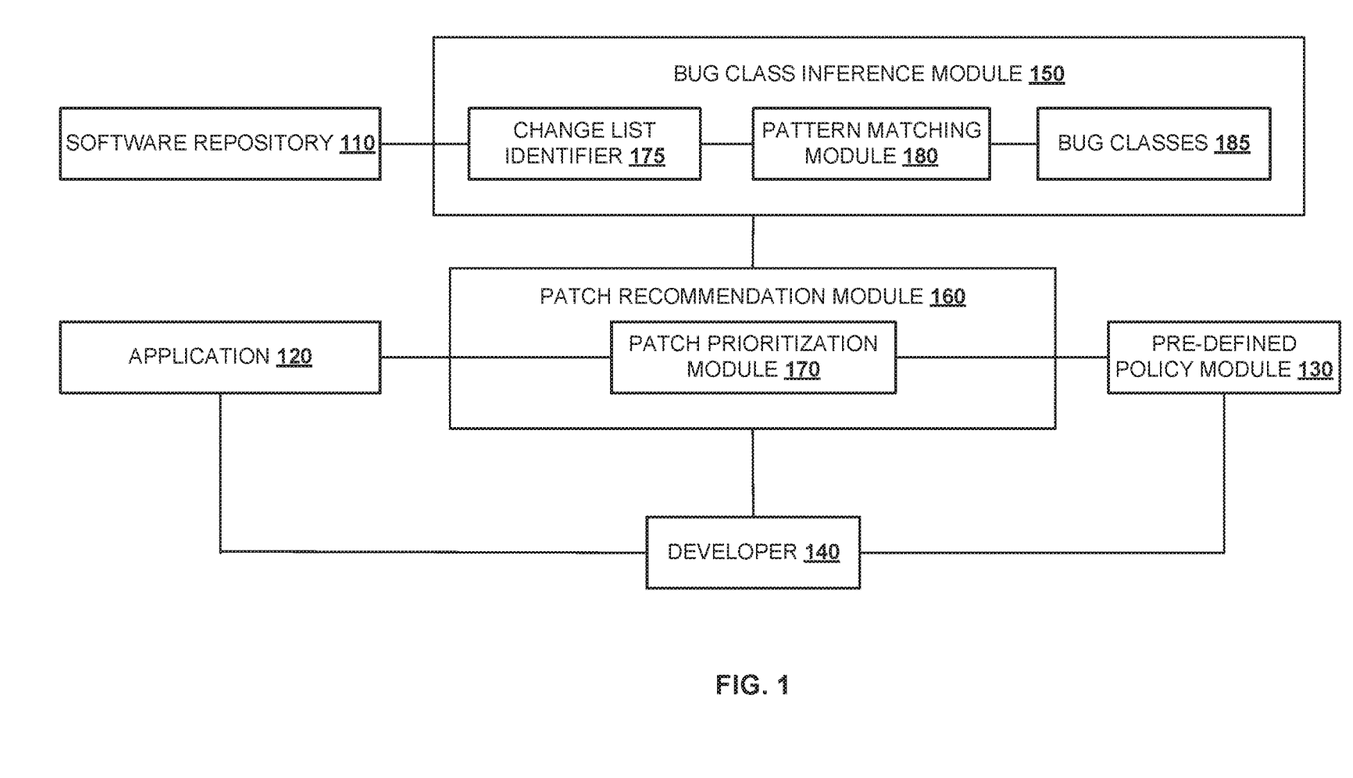
FIG. 1 is a block diagram of an example computing environment illustrating classifying and prioritizing software patches, according to an embodiment.

FIG. 1 is a block diagram of an example computing environment illustrating classifying and prioritizing software patches, according to an embodiment. A software bug can be referred as an error in software design or source code resulting in unintended software behavior. Once the software bug is discovered, the software bug is corrected by means of a software patch. The software patch may include a number of source or binary code changes. FIG. 1 describes an exemplary architecture of a software system for supporting automated, pattern-based classification and prioritization of the software patches.

Components (e.g., software repository 110, application 120 and pre-defined policy module 130) represent external data sources read by the example architecture. The software repository 110 can be referred as a storage location from which different software patches of an application may be retrieved and installed on a system (e.g., computer). The application 120 can be referred as a computer program designed to perform a group of coordinated functions, tasks, or activities. Examples of an application may include, but not limited to a word processor, a spreadsheet, an accounting application, a web browser, a media player, a console game and a photo editor. The pre-defined policy module 130 may include a pre-defined policy. The pre-defined policy may be referred as a statement of intent and implemented as a procedure or a protocol. The pre-defined policy may include rules based on which the software patches are prioritized for installation and the pre-defined policy may be defined by a developer or a user (e.g., 140), for instance.

In one exemplary embodiment, bug class inference module 150 identifies instances of bug fix patterns in the changes of source or binary code of software patches. Further, patch recommendation module 160 may prioritize the software patches based on the identified instances of the bug fix patterns. The patch recommendation module 160 reads the application 120 (e.g., as an input). The software patches available for the application 120 are identified by the bug class inference module 150 by interacting with the software repository 110. Further, a change list and instances of bug fix patterns are identified. In one example, change list identifier 175 interacts with the software repository 110 and identifies the change list of a given software patch. Pattern matching module 180 identifies the instances of the bug fix patterns present in the change list and classifies the instances using bug classes 185. The bug classes 185 may include classification of bugs based on nature of the bug (e.g., functional bugs and non-functional bugs).

In one exemplary embodiment, patch prioritization module 170 assigns a patch priority for each software patch analyzed by the bug class inference module 150 based on the pre-defined policy. Therefore, new software patches are informed to the developer or the user (e.g., 140) along with an understanding of the actual changes introduced by the software patches. Further, with the assigned priorities, a decision can be made to install the software patch.

In one exemplary embodiment, the components depicted in FIG. 1 can be framed in different manners. For example, the change list identifier 175 can be a part of the functionality of the software repository 110. Further, the application 120 and the pre-defined policy can be provided by the application developer or the user, while the software repository 110 and the bug classes 185 can be provided by the same or different service providers/organizations.

Figure 2:
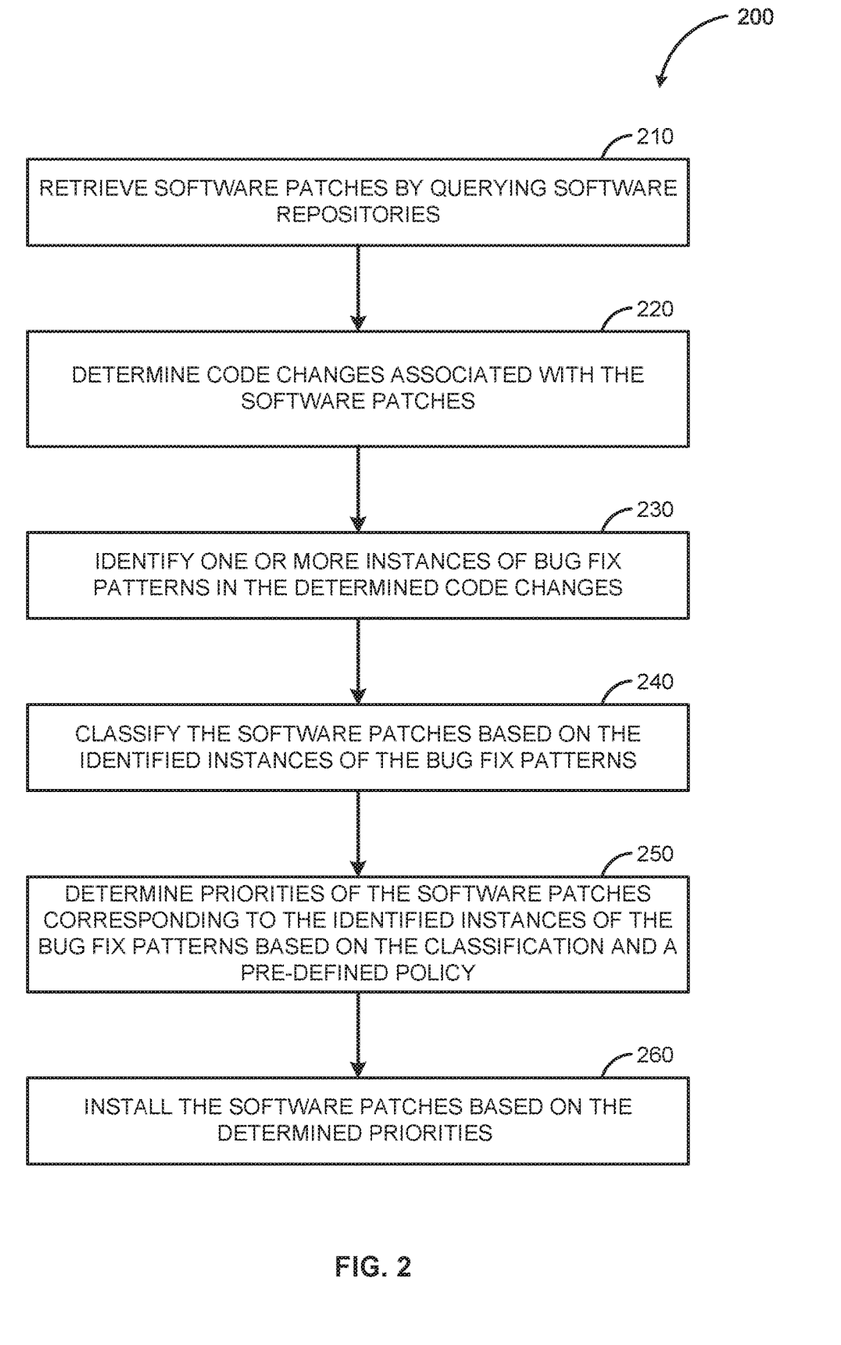
FIG. 2 is a flow diagram illustrating an example process to classify and prioritize software patches, according to an embodiment.

FIG. 2 is a flow diagram illustrating example process 200 to classify and prioritize software patches, according to an embodiment. The software patches are used to fix bugs, replace graphics and improve usability or performance of an application, for instance. At 210, the software patches associated with the application are retrieved by querying software repositories. Software patches can include a major update (e.g., from version 1.0.0 to 2.0.0) or a minor update (e.g., from version 1.0.0 to 1.1.0). The major update may include new functionality, while the minor update may include bug (e.g., security bugs, user interface bugs and performance bugs) fixes of existing functionality.

In one exemplary embodiment, when third party libraries are used by the application, a set of libraries associated with the application is identified. A library can be referred as a collection of programs and software packages that the application depends on. Further, the software patches for the libraries are retrieved by querying software repositories associated with the set of libraries. The software repository such as Maven® central repository, for instance, may include libraries. Thereby, the software repository may provide an overview of existing versions of a library. For example, for each identified library, the software repositories are queried to search for available software patches (i.e., library versions that differ in regards to the version number from the library currently in use). Further, the query can result in multiple versions or software patches of the library, for instance.

At 220, code changes associated with the software patches are determined. The code changes are determined by differencing or comparing adjacent software patches, for instance. For example, the software code of software patch 'L1' with the code of the original library 'L' is compared. The comparison of two sets of source codes can be performed by employing techniques to decompile binary or intermediate code representations, or to statically analyze source code, for instance. Further, for multiple patches of the library L (e.g., the application uses library version 1.0.0 and there exist the software patches 1.0.1 and 1.0.2), the comparison steps may be applied multiple times in order to compare each adjacent version.

In one exemplary embodiment, the result of the comparison of two software patches is referred as a change list. Code changes that are part of the change list can be, for instance, addition of a new function, insertion of a new statement inside an existing function, change in the order of existing statements, or modification of an existing statement of a given kind. Further, nature of change list elements depends on specifics of a programming language, such as, but not limited to Java®, JavaScript® or Objective-C®.

At 230, one or more instances of bug fix patterns are identified in the determined code changes. The instances of the bug fix patterns are identified by analyzing the identified code changes. In one exemplary embodiment, the change list (e.g., a total set of code changes introduced by a new version) can be searched for occurrences of the different bug fix patterns. For example, instances (I) of bug fix patterns (B) introduced by the software patch 'L1' for a library 'L' may be identified by an equation (1).

$$\text{Bugs}(L, L1, B) = (I, U) \quad (1)$$

where:
L is a library with version(L)=x,
L1 is an updated version of L with version(L1)=y, whereby y>x (i.e., L1 is a new version or software patch of L),
B is a set of bug fix patterns (i.e., a flat list of independent patterns in the simplest case, or a more complex structure expressing relationships, e.g., a hierarchy),
I is a set of concrete instances of bug fix patterns, where each $i \in I$ is the instance of exactly one bug fix pattern $b \in B$, and
U is the set of source code changes that could not be assigned to instances of bug fix patterns.

In one exemplary embodiment, when an instance of a bug fix pattern 'bi' $\in$ 'B' is found for a given change list of 'L1', a new bug instance 'i' can be added to the set 'I'. Further, pattern matching may be performed with different levels of confidence, e.g., depending on how many optional elements of the bug fix pattern actually occur. Thereby, the set 'I' may include instances of bug fix patterns found in library version 'L' compared to the version 'L'. The set 'U' may include the source code changes that could not be automatically assigned to instances of bug fix patterns. Therefore, with the set 'U', the quality of bug fix patterns 'B' can be judged and/or the introduction of functional changes by the software patch can be assessed.

At 240, the software patches are classified according to the identified bug fix patterns respective to bug class. The knowledge of the bug class may be required by the user or developer to decide whether to install the software patch. In other words, the software patches are classified based on bug classes. In one exemplary embodiment, the bug classes can be, but not limited to functional bugs and non-functional bugs (e.g., performance bugs and security bugs).

At 250, priorities of the software patches corresponding to the identified instances of bug fix patterns are determined based on the classification and pre-defined policy. In one example, the pre-defined policy includes priorities (e.g., low, medium and high) and/or actions (e.g., update, ignore) corresponding to the software patches. Further, the priority can be related to the number of actual bugs, or the different classes of bugs, e.g., Structured Query Language (SQL) injection and EXtensible Markup Language (XML) injection.

For example, prioritization of library updates 'U' for the application 'A' is depicted in equation (2)

$$\text{prioritize}(A, R, P) = U \quad (2)$$

where:
A is an application with dependencies on third party libraries (e.g., L1 . . . n),
R is a set of online software repositories to check for and obtain library updates.
P is a set of pre-defined policies giving priority to the bug fix patterns $b \in B$, and
U is a set of library updates available in software repositories R, together with a priority according to the identified instances of bug fix patterns and the pre-defined policy P.

At 260, the software patches are installed based on the determined priorities. In one exemplary embodiment, a list of prioritized library updates for all dependencies of the application is presented. Error! Reference source not found, illustrates an example output, where the priority of the respective library update results from the sum of the findings of instances of bug fix patterns. Further, a number of unclassified source code changes can be used to assess the risk that changes other than bug fixes introduced in the code (e.g., changes to the functionality). Table 1 includes information of the library "Foo 1.0.0", where original code is compared with code of the software patches (e.g., "Foo 1.0.1" and "Foo 1.0.2"). Based on the comparison, the bug fix patterns are identified and priorities for the software patches are assigned using the pre-defined policy.

TABLE 1

| Dependency (current) | Dependency (updates) | Occurrences of Bug Fix Patterns | Priority |
|---|---|---|---|
| Foo 1.0.0 | Foo 1.0.1 | SQL Injection: 5<br>XML Injection: 1<br>Unclassified changes (U): 0 | 6 |
|  | Foo 1.0.2 | SQL Injection: 1<br>XML Injection: 0<br>Unclassified changes (U): 12 | 1 |

The software patches fixing security bugs may be given high priority as the security bugs can have a disastrous impact on application users and in turn on the reputation of the application developer. Further, the software patches fixing user interface bugs, for instance, may be less impactful and may not necessarily require an immediate installation. Therefore, the described method may facilitate and automate the decision making process by inferring the bug classes fixed by the software patch. Depending on the pre-defined policy, the library updates available in the software repositories may be suggested with different priorities. With the information of actual changes in each version of the application and corresponding priorities, the developer or the user may stay up-to-date and making cost effective decisions in installing the software patches.

Figure 3:
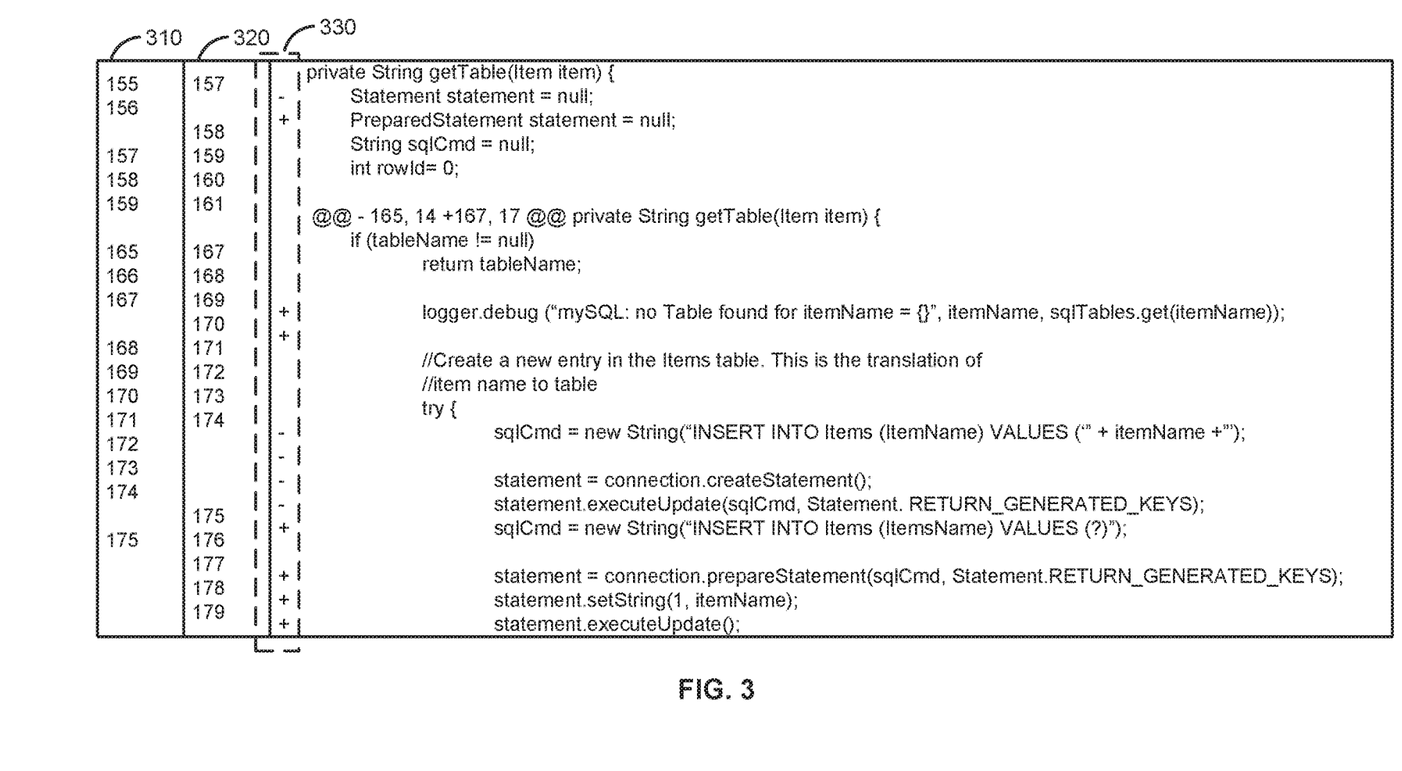
FIG. 3 shows an exemplary code changes between two software patches, according to an embodiment.

FIG. 3 shows an exemplary code changes between two software patches, according to an embodiment. In the example, a software patch is released in order to fix Structured Query Language (SQL) injection vulnerability. Code lines 310 depicts line numbers of source code of vulnerability version and code lines 320 depicts line numbers of source code of revised version (e.g., a new software patch). Code lines (e.g., 330) depicting '−' are deleted from the vulnerable version of the source code file and the code lines depicting '+' are added to the fixed or revised version. In one exemplary embodiment, a bug fix pattern can be defined as a number of code changes between a vulnerable and revised version of a source code file, and which resolve a certain class of software bug. For example, bug fix pattern for SQL injection vulnerabilities in Java® programming language can be as follows:

Remove: Declaration of variable <x> of type <Statement>
Insert: Declaration of variable <y> of type <PreparedStatement>
Remove: Invocation of method <executeUpdate(String, int)> on <x>
Insert: Invocation of method <prepareStatement(String, in)> on variable <z> of type <Connection>
Insert: One or multiple invocations of method <setString (int,String)> on <y>
Insert: Invocation of method <executeUpdate( )> on <y>

In one exemplary embodiment, for a bug fix pattern, variable identifiers, the order of statements, globally or locally scoped variables, and information that may be specific to an instance of the bug fix pattern are considered. Further, elements of the bug fix patterns may not exist exactly once in a given order. Instead, the elements of the bug fix patterns may be optional, may be partially ordered or not ordered, may have cardinalities, or may exist conditionally, for instance. Also, the bug fix patterns can be defined over different representations of source code. For example, text files or abstract syntax trees (AST). Abstract syntax trees, in particular, may be suited for further analysis, as they preserve syntactical information. In the example of FIG. 3, the pattern is instantiated in the lines 156 and 174 of the vulnerable file revision, and lines 158, 177, 178 and 179 of the new file revision.

Figure 4:
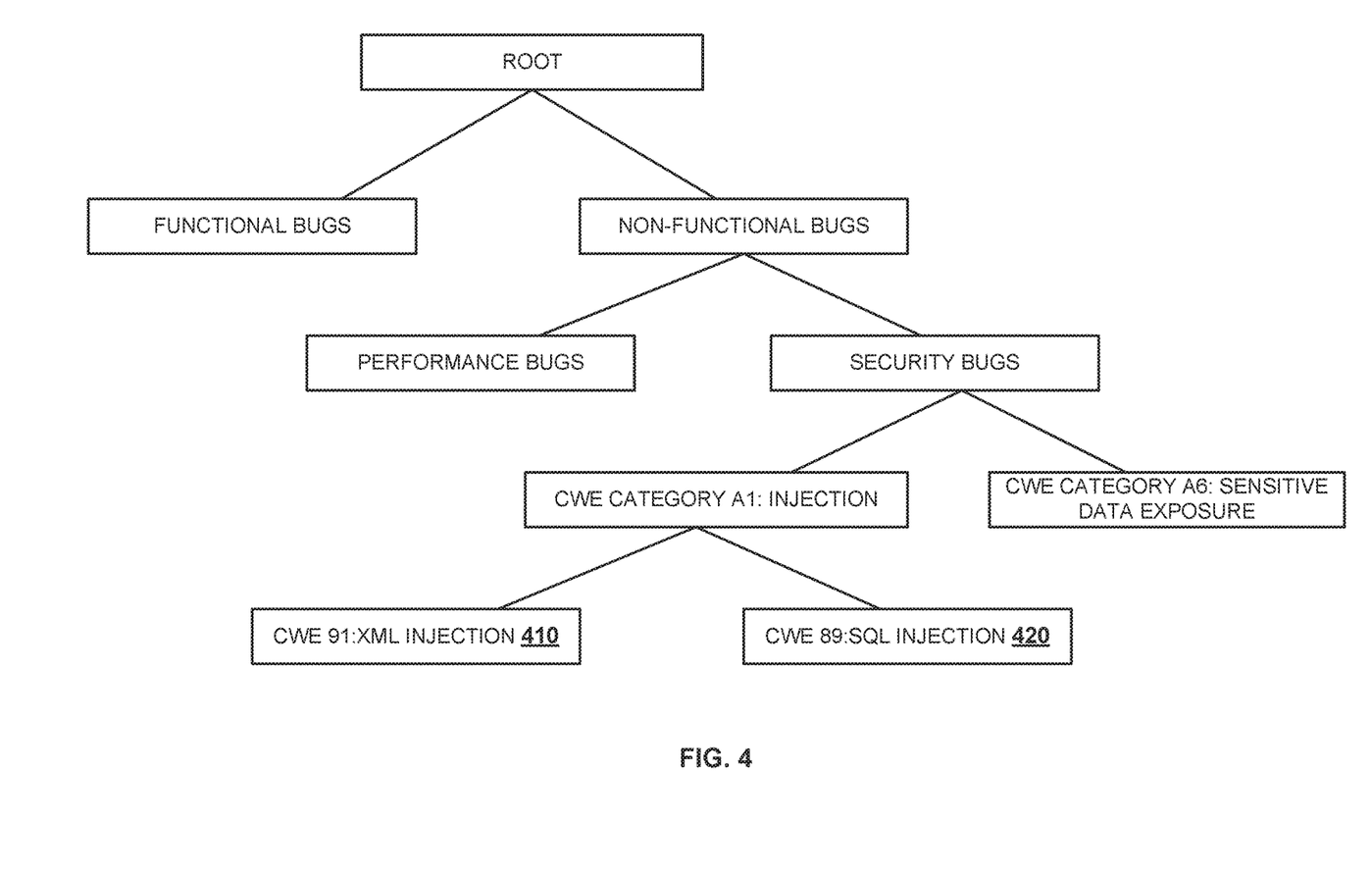
FIG. 4 shows an example classification of bug classes, according to an embodiment.

FIG. 4 shows an example classification of bug classes, according to an embodiment. Change list (e.g., a total set of code changes introduced by a software patch) is searched for occurrences of different bug fix patterns. FIG. 4 exemplifies a set of bug fix patterns organized in a hierarchy. In the example, leaves (e.g., 410 and 420) of the tree represent actual bug fix patterns (corresponding to the different Common Weakness Enumeration (CWE) weaknesses). CWE is a software community project that aims at generating a catalog of typical software weaknesses and vulnerabilities. Other nodes serve structuring purposes describing different classes of bugs. For example, bugs may be classified as functional bugs and non-functional bugs. Further, the non-functional bugs may be classified as performance bugs and security bugs. Also, there exists different types of security bugs (e.g., injection and sensitive data exposure corresponding to CWE). Further, based on the bug classes and pre-defined policy, software patches are prioritized for installation.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
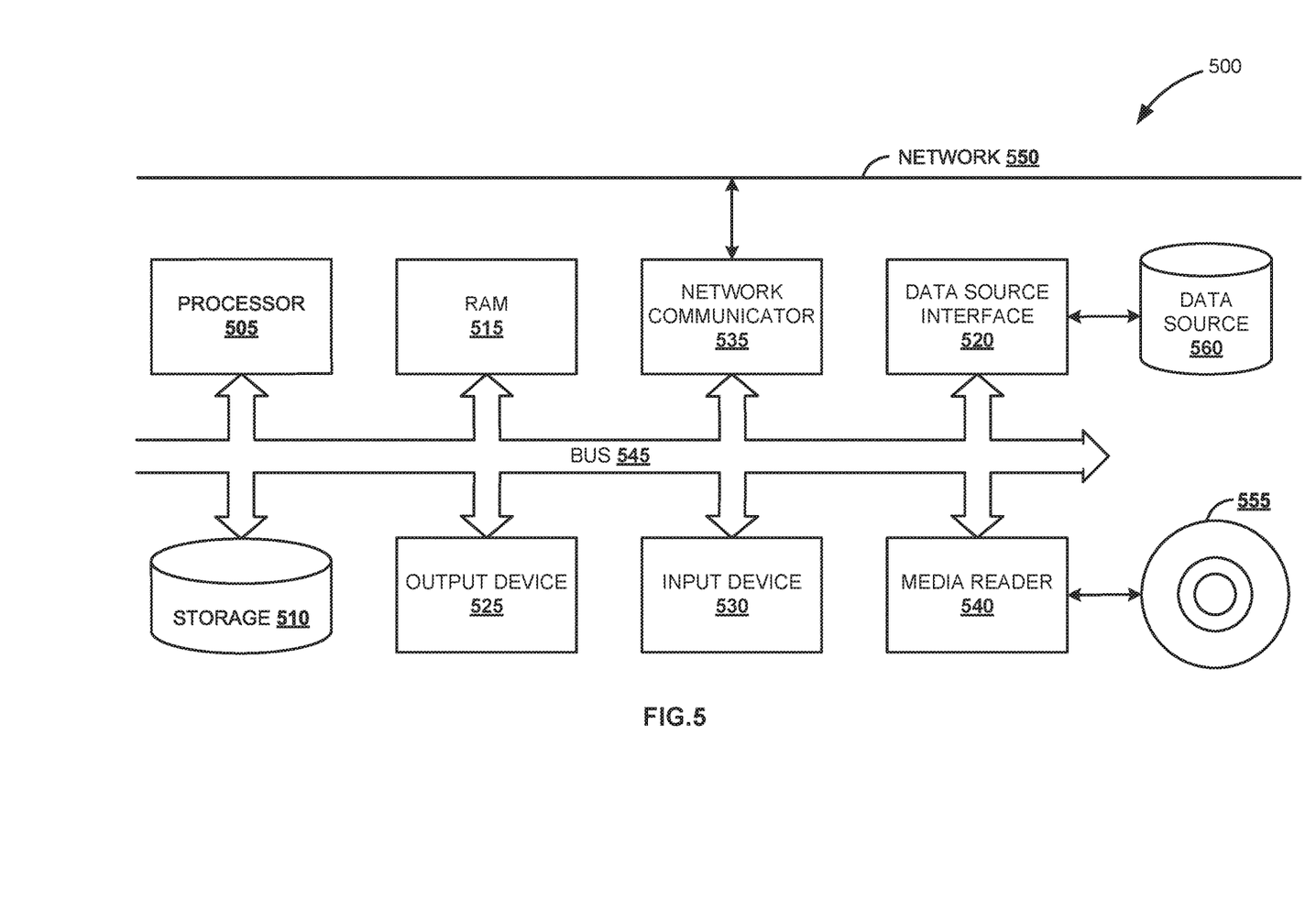
FIG. 5 is a block diagram illustrating an exemplary computer system, according to an embodiment.

FIG. 5 is a block diagram of example computer system 500, according to an embodiment. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. One or more of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments, the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a computer cause the computer to perform operations comprising:
   retrieving software patches by querying software repositories;
   analyzing a change list comprising one or more code changes between a first software patch and a subsequent software patch of the software patches;
   identifying one or more instances of one or more bug fix patterns in the one or more code changes;
   adding the one or more instances to a set of instances of bug fix patterns that resolve different bug classes, wherein a bug fix pattern of the bug fix patterns corresponds to a bug class of the bug classes;
   classifying the subsequent software patch based on the set of instances of the bug fix patterns;
   based on the classification, automatically determining a priority of the subsequent software patch, wherein the priority corresponds to a sum of occurrences of the one or more instances; and
   installing the software patches according to a pre-defined policy based on determined priorities of the software patches.

2. The non-transitory computer-readable medium of claim 1, wherein the one or more code changes are determined by comparing source code of the first software patch and source code of the subsequent software patch.

3. The non-transitory computer-readable medium of claim 1, wherein the one or more code changes depend on specifics of a programming language.

4. The non-transitory computer-readable medium of claim 1, wherein the pre-defined policy comprises a statement of intent including rules based on which the software patches are prioritized for installation.

5. The non-transitory computer-readable medium of claim 1, wherein the pre-defined policy comprises priorities and actions corresponding to the software patches.

6. A computer implemented method to classify and prioritize software patches, comprising:
   retrieving software patches by querying software repositories;
   analyzing a change list comprising one or more code changes between a first software patch and a subsequent software patch of the software patches;
   identifying one or more instances of one or more bug fix patterns in the one or more code changes;
   adding the one or more instances to a set of instances of bug fix patterns that resolve different bug classes, wherein a bug fix pattern of the bug fix patterns corresponds to a bug class of the bug classes;
   classifying the subsequent software patch based on the set of instances of the bug fix patterns;
   based on the classification, automatically determining a priority of the subsequent software patch, wherein the priority corresponds to a sum of occurrences of the one or more instances; and
   installing the software patches according to a pre-defined policy based on determined priorities of the software patches.

7. The computer implemented method of claim 6, wherein the one or more code changes are determined by comparing source code of the first software patch and source code of the subsequent software patch.

8. The computer implemented method of claim 6, wherein the one or more code changes depend on specifics of a programming language.

9. The computer implemented method of claim 6, wherein the pre-defined policy comprises a statement of intent including rules based on which the software patches are prioritized for installation.

10. The computer implemented method of claim 6, wherein the pre-defined policy comprises priorities and actions corresponding to the software patches.

11. A computing system to classify and prioritize software patches, comprising:
    at least one processor; and
    one or more memory devices communicative with the at least one processor, wherein the one or more memory devices store instructions to:
       retrieving software patches by querying software repositories;
       analyzing a change list comprising one or more code changes between a first software patch and a subsequent software patch of the software patches;
       identifying one or more instances of one or more bug fix patterns in the one or more code changes;
       adding the one or more instances to a set of instances of bug fix patterns that resolve different bug classes, wherein a bug fix pattern of the bug fix patterns corresponds to a bug class of the bug classes;
       classifying the subsequent software patch based on the set of instances of the bug fix patterns;
       based on the classification, automatically determining a priority of the subsequent software patch, wherein the priority corresponds to a sum of occurrences of the one or more instances; and
       installing the software patches according to a pre-defined policy based on determined priorities of the software patches.

12. The computing system of claim 11, wherein the one or more code changes are determined by comparing source code of the first software patch and source code of the subsequent software patch.

13. The computing system of claim 11, wherein the one or more code changes depend on specifics of a programming language.

14. The computing system of claim 11, wherein the pre-defined policy comprises a statement of intent including rules based on which the software patches are prioritized for installation.

* * * * *